(12) United States Patent
Rokosz et al.

(10) Patent No.: US 11,802,973 B2
(45) Date of Patent: Oct. 31, 2023

(54) METHOD FOR AN ADAPTIVE ASCERTAINMENT OF AN INTEGRITY RANGE OF A PARAMETER ESTIMATE

(71) Applicant: Robert Bosch GmbH, Stuttgart (DE)

(72) Inventors: Csaba Rokosz, Dad (HU); Lena Schindler, Gerlingen (DE); Marco Limberger, Ludwigsburg (DE); Thomas Friederichs, Aspach-Hohrot (DE)

(73) Assignee: ROBERT BOSCH GMBH, Stuttgart (DE)

( * ) Notice: Subject to any disclaimer, the term of this patent is extended or adjusted under 35 U.S.C. 154(b) by 240 days.

(21) Appl. No.: 17/281,795

(22) PCT Filed: Dec. 12, 2019

(86) PCT No.: PCT/EP2019/084824
§ 371 (c)(1),
(2) Date: Mar. 31, 2021

(87) PCT Pub. No.: WO2020/126795
PCT Pub. Date: Jun. 25, 2020

(65) Prior Publication Data
US 2021/0389473 A1 Dec. 16, 2021

(30) Foreign Application Priority Data
Dec. 20, 2018 (DE) .......................... 102018222663.6

(51) Int. Cl.
*G01S 19/20* (2010.01)
*G01S 19/45* (2010.01)

(52) U.S. Cl.
CPC .............. *G01S 19/20* (2013.01); *G01S 19/45* (2013.01)

(58) Field of Classification Search
CPC .................................. G01S 19/20; G01S 19/45
(Continued)

(56) References Cited

U.S. PATENT DOCUMENTS 11,567,216 B2 * 1/2023 Raasakka .............. G01S 19/215
2004/0239560 A1 12/2004 Coatantiec et al.
(Continued)

FOREIGN PATENT DOCUMENTS

EP 3470882 A1 * 4/2019 ............. G01C 21/10
FR 3020469 A1 10/2015
(Continued)

OTHER PUBLICATIONS

International Search Report for PCT/EP2019/084824 dated Mar. 19, 2020.

*Primary Examiner* — Harry K Liu
(74) *Attorney, Agent, or Firm* — NORTON ROSE FULBRIGHT US LLP; Gerard Messina

(57) ABSTRACT

A method for the adaptive ascertainment of an integrity range of a parameter estimate, the integrity range describing the range within which an estimated parameter is located with a minimum probability. The method includes: a) Ascertaining basic integrity information with the aid of a base module of a modular system, b) ascertaining an item of first supplementary integrity information with the aid of a first supplementary module of the modular system if at least one precondition for the ascertaining of the item of first supplementary integrity information has been satisfied, c) ascertaining the integrity range using at least the item of basic integrity information or at least the basic integrity information and the item of first supplementary integrity information if the first item of supplementary integrity information was ascertained.

9 Claims, 2 Drawing Sheets

(58) Field of Classification Search
USPC .................................................. 342/357.58
See application file for complete search history.

(56) References Cited

U.S. PATENT DOCUMENTS

2008/0062041 A1    3/2008  Lee
2014/0292574 A1   10/2014  Dunik et al.
2017/0351253 A1 * 12/2017  Yang ..................... G06F 3/017

FOREIGN PATENT DOCUMENTS

FR       3066612 A1 * 11/2018   ............. G01S 19/20
JP    2009019992 A      1/2009
JP    2009198492 A      9/2009
JP    2010506156 A      2/2010
RU       2672676 C2 * 11/2018   ............. G01S 19/20
WO   WO-2023275764 A1 *  1/2023

* cited by examiner

METHOD FOR AN ADAPTIVE ASCERTAINMENT OF AN INTEGRITY RANGE OF A PARAMETER ESTIMATE

FIELD

The present invention relates to a method for an adaptive ascertainment of an integrity range of a parameter estimate, to a computer program, a machine-readable memory medium, and a control unit for a motor vehicle. The present invention may be used to particular advantage in connection with autonomous driving.

BACKGROUND INFORMATION

One of the most important challenges in autonomous driving is the most precise and reliable determination of the ego position of the autonomous vehicle. The autonomous vehicle is normally equipped with sensors such as inertial sensors, wheel sensors, environment sensors, GNSS sensors, optical and/or acoustic sensors which allow the vehicle to estimate its own position. It is helpful in this context if in addition to an ascertained ego position, information about its (expected) estimation accuracy is output as well. For example, the confidence of the ascertained ego position may be represented by what is known as a 'protection level' (abbreviated: PL). The PL may describe a statistical error limit whose calculation is normally based on statistical considerations and possibly also on a suitable adaptation of the estimation algorithms.

In particular in the aeronautics field, the concept of providing the protection level is quite common. However, the developed approaches there are not readily transferrable to the application field of autonomous driving. For example, in particular long blocks of high-rise buildings and their influence on satellite signals constitute problems that do not occur in air traffic applications. Better methods for calculating the most reliable protection level are therefore desirable, which particularly are also able to provide reliable results in difficult environments such as in urban areas.

SUMMARY

In accordance with an example embodiment of the present invention, a method for the adaptive ascertainment of an integrity range of a parameter estimate is provided, the integrity range describing the range in which an estimated parameter lies with a minimum probability. The method includes at least the following steps:
a) Ascertaining an item of basic integrity information with the aid of a base module of a modular system;
b) Ascertaining an item of first supplementary integrity information with the aid of a first supplementary module of the modular system if at least one precondition for the ascertaining of the item of first supplementary integrity information has been satisfied;
c) Ascertaining the integrity range using at least the basic integrity information or at least the basic integrity information and the item of first supplementary integrity information if the item of first supplementary integrity information was ascertained.

Steps a) and b) are preferably able to be at least partly carried out in parallel or even simultaneously. In a furthermore preferred manner, steps a) and b) are at least partly carried out prior to step c).

The integrity range describes the range within which an estimated parameter (value) (actually) lies with a minimum probability. The estimated parameter (value) basically describes a (single, in particular instantaneous) estimation result of the parameter estimate. In other words, this means that the integrity range describes the range within which a real or actual value of an estimated parameter lies with a minimum probability. Such an integrity range may also be referred to as a 'protection level'.

The minimum probability is a predefined minimum probability. The minimum probability preferably amounts to 90%, especially preferably to 95% or even 99%.

The integrity range preferably is a protection level. The protection level normally describes the (spatial, in particular two- or three-dimensional) range within which an estimated parameter (value) (actually) lies with a minimum probability. The estimated parameter (value) basically describes a (single, in particular instantaneous) estimate result of the parameter estimate. In other words, the protection level in particular describes the range within which a real or actual value of an estimated parameter lies with a minimum probability.

Expressed in still other words, a protection level particularly describes a confidence interval or a (spatial) confidence range in which the true value of an estimated parameter is located with a minimum probability. The estimated value of the parameter is usually in the middle or the center of the confidence interval or confidence range.

The minimum probability at which a real or actual value of an estimated parameter actually lies in a protection level is actually much higher than in "usual" integrity ranges. Here, the minimum probability lies above 99.99% as a rule, especially preferably above 99.999% or even above 99.9999%. It is also possible to express the minimum probability in the protection level not as a percentage but in the form of possible errors within a certain time interval. A protection level, for example, may be defined so that the parameter in question lies outside the protection level maximally once in ten years. For example, the protection level may be expressed either as a unitless probability or as a rate, i.e., as an error-occurrence probability across a time interval.

Preferably, in accordance with an example embodiment of the present invention, the method is used for ascertaining an integrity range of a parameter estimate of a driving operation parameter of a motor vehicle. The driving operation parameter usually involves a safety-critical or safety-relevant parameter of the driving operation of a motor vehicle. The driving operation parameter preferably is a (safety-critical or safety-relevant) parameter of the driving operation of a motor vehicle which is operating (or being operated) in an at least partially automated or even autonomous manner.

In this context, a driving operation parameter is particularly understood as a parameter which contributes to the description of the spatial driving operation of a motor vehicle or the operation of a motor vehicle in space. More specifically, the driving operation parameter at least contributes to a description of an ego movement and/or an ego position of a motor vehicle. For example, the driving operation parameter may be an (ego) position, an (ego) velocity, an (ego) acceleration or a position (or orientation) of the motor vehicle. Preferably, the driving operation parameter involves an ego position of the motor vehicle.

In accordance with an example embodiment of the present invention, the method is preferably used for ascertaining an integrity range which describes the integrity of an estimate of an ego position of a vehicle. In other words, this specifically means that the parameter preferably involves an ego position of a vehicle. For example, the present method may (thus) be used for ascertaining an integrity range of a position estimate of a vehicle position. The integrity range may then describe the range within which an estimated ego position of a vehicle is (actually) located with a minimum probability. Alternatively or cumulatively to the estimate of the ego position of the vehicle, the present method may also be used to estimate the ego velocity, the orientation, the ego movement or the like of the vehicle.

The parameter estimate may encompass one or more method(s) for estimating a (the same) parameter. For instance, the parameter estimate may encompass at least two methods which differ from each other such as a first method and a second method for estimating the parameter that differs from the first method. Preferably used are methods for estimating the parameter that are furthermore also able to supply and/or determine an item of integrity information about the integrity of the estimate.

The solution provided here in accordance with an example embodiment of the present invention advantageously allows for a more dynamic ascertainment of the integrity range, in particular by a possible adaptation of the ascertainment method to external influences and/or the given applications. In comparison with methods for calculating the integrity range that are based either on purely empirical models or purely stochastic models, the solution provided here for the first time allows for an adaptive and therefore especially a more dynamic and/or more efficient ascertainment of the integrity range.

In particular, in accordance with an example embodiment of the present invention, the modular structure of the system, which allows for a connection of one or more supplementary modules according to the requirements, e.g., in order to increase the accuracy of the ascertainment of the integrity range (for instance by considering quality indicators) and/or to compensate for (foreseeable) restrictions of the methodology of the base module, contributes to an increase in the dynamics and/or the efficiency. For instance, a base module which essentially operates with GNSS information might function only with limitations in certain scenarios such as a long street lined with rows of high-rise buildings (i.e. shadowing of the satellite reception). In such a case, a supplementary module, which mainly operates with the aid of environment sensors of the vehicle, could be connected.

In step a), an item of basic integrity information is ascertained, in particular via the parameter estimate or for an estimated parameter, using a base module of a modular system. In other words, this particularly means that an item of basic integration information about an estimate result of the parameter estimate or about the integrity of the parameter estimate is ascertained in step a) with the aid of a base module of a modular system.

The system may be implemented as a physical system or as a computer program. The basic integrity information may be a variance and/or a residuum of the parameter estimate, for example. Furthermore, the basic integrity information may (alternatively) also involve an item of information that is ascertained as a function of a variance and/or a residuum and/or some (other) indicator of the trustworthiness of the estimate.

The parameter estimate and/or the ascertainment of the basic information may be realized on the basis of data from a sensor of a motor vehicle, for instance. Preferably, the ascertainment of the basic integrity information is carried out at least also on the basis of GNSS (Global Navigation Satellite System) data (e.g., GNSS correction data or data including both GNSS position data and GNSS correction data) from a GNSS sensor of a motor vehicle.

In step b), an item of first supplementary integrity information is ascertained, in particular via the parameter estimate or in connection with an estimated parameter, with the aid of a first supplementary module (that differs from the base module) of the modular system if at least one precondition for the ascertainment of the item of first supplementary integrity information has been satisfied. This particularly means that an item of first supplementary integrity information about an estimate result of the parameter estimate or about the integrity of the parameter estimate is ascertained in step b) with the aid of a first supplementary module of a modular system.

The parameter estimate and/or the ascertainment of the item of first supplementary integrity information may be carried out on the basis of data from a sensor of a motor vehicle, for example. Preferably, the ascertainment of the item of first supplementary integrity information is also performed at least on the basis of data from an environment sensor of a motor vehicle. The environment sensor may be a camera, a RADAR sensor, a LIDAR sensor and/or an ultrasonic sensor, for example.

One precondition for the ascertainment of the first item of supplementary integrity information, for instance, may be that the accuracy of the ascertainment of the integrity range is to be increased at the moment or for a certain period of time, and/or a limited accuracy of the base module is to be assumed at the moment. A further (alternative or cumulative) precondition, for example, may be that the vehicle (for which the parameter estimate is carried out) is currently involved in a certain scenario (such as a long block of high-rise buildings, a tunnel, night driving). (Alternatively or cumulatively), a release of the first supplementary module may also be used as a precondition, or the circumstance that the first supplementary module is provided. The fact that the ascertainment of the first item of supplementary integrity information depends on a precondition advantageously allows for an adaptive ascertainment of the integrity range in which the first supplementary module is able to be connected if it is required.

In step c), the integrity range is ascertained using at least the basic integrity information or at least the basic integrity information and the first item of supplementary integrity information if the first item of supplementary integrity information has been ascertained (in an immediately preceding step b). In this context, for example, a possibly weighted superposition of the basic integrity information with at least the first item of supplementary integrity information (and/or possibly a further (e.g., second, third, etc.) item of supplementary integrity information) may be implemented.

The integrity range preferably is a confidence interval. A confidence interval (also referred to as a trust range or trust interval or expected range) is an interval from statistics, whose purpose it is to indicate the precision of the position estimate of a parameter (such as a mean value). The confidence interval indicates the range that includes the true position of the parameter with a certain probability (the confidence level) in an infinite repetition of a random experiment.

According to one advantageous embodiment of the present invention, it is provided that the basic integrity information is ascertained on the basis of at least one stochastic parameter. Residues, variances, covariances or the like are possible as stochastic parameters, in particular. For example, the basic integrity information is able to be ascertained on the basis of an analysis of monitoring residues from a parameter estimate or on the basis of an analysis of the estimated variances (e.g., from a least square compensation or Kalman filtering).

According to a further advantageous embodiment of the present invention, it is provided that a mathematical basic model is stored in the base module. The base model may be a filter model such as a Kalman filter. In addition, functions that describe a state are basically possible, in particular what are known as "state monitors", for example including fuzzy methods or the like.

According to another advantageous embodiment of the present invention, the item of first supplementary integrity information is ascertained on the basis of at least one quality indicator for a data quality of sensor data. In this context, the item of first supplementary integrity information may be implemented on the basis of at least one quality indicator for a data quality of sensor data from at least one sensor of a (the) motor vehicle. The at least one sensor usually involves a sensor that also supplies data (possibly including errors) for the parameter estimate.

The item of first supplementary integrity information is preferably ascertained on the basis of at least two different, quality indicators, possibly weighted against each other, for the data quality of sensor data from one or more (different) sensor(s) (of the motor vehicle). In addition, it may be provided that the item of first supplementary integrity information encompasses one or more quality indicator(s), in particular weighted relative to one another and/or differing from one another.

According to a further advantageous embodiment of the present invention, in step c), weighting of at least the basic integrity information and the item of first supplementary integrity information is carried out if the item of first supplementary integrity information has been ascertained. The weighting, for example, may be carried out as a function of the frequency of an error occurrence, the importance, the severity degree, and others.

According to another advantageous embodiment of the present invention, weighting as a function of at least one quality indicator takes place. In this context, weighting as a function of at least one quality indicator for a data quality of sensor data from a sensor of a motor vehicle may be implemented. The weighting in step c) is able to be realized in particular as a function of at least one quality indicator. Alternatively or cumulatively, weighting as a function of at least one quality indicator may be carried out in one of the modules.

According to a further advantageous embodiment of the present invention, at least one item of second supplementary integrity information, in particular pertaining to the parameter estimate or pertaining to an estimated parameter, is determined with the aid of a second supplementary module (differing from the base module and/or the first supplementary module) of the modular system if at least one precondition for the ascertainment of the item of second supplementary integrity information has been satisfied. In other words, an item of second supplementary integrity information about an estimate result of the parameter estimate or about the integrity of the parameter estimate is able to be ascertained with the aid of a second supplementary module of a modular system.

One precondition for the ascertainment of the item of second supplementary integrity information, for example, may be that the accuracy of the ascertainment of the integrity range is to be increased at the moment or for a certain period of time and/or a limited accuracy of the base module and/or of a first supplementary module has to be assumed at the moment. A further (alternative or cumulative) precondition, for instance, may be that the motor vehicle (for which the parameter estimate is conducted) is currently located in a certain setting (such as a long row of high-rise buildings, a tunnel, or night driving). (Alternatively or cumulatively) a release of the second supplementary module may serve as a precondition or the circumstance that the second supplementary module is provided. The fact that the ascertainment of the item of second supplementary integrity information is tied to a precondition advantageously allows for an adaptive ascertainment of the integrity range in which the second supplementary module may be connected if needed.

In addition, further supplementary modules such as a third supplementary module, a fourth supplementary module, etc. may be provided in accordance with an example embodiment of the present invention. The different modules may assume different functions in the ascertainment of the integrity range. Moreover, the different modules can participate in the ascertainment of the integrity range if they are needed.

It may additionally be provided that one or more of the module(s) (e.g., the base module and/or a first supplementary module) participate(s) in the ascertainment of the integrity range in an error-specific manner. For this purpose, for example, the system may be configured in such a way that in a certain (expected) error case of the parameter estimate, a certain module is included in the ascertainment of the integrity range. This may advantageously assist in resolving a certain error case or a series of errors.

According to a further aspect of the present invention, a computer program for carrying out a method introduced here is provided as well. In other words, this particularly relates to a computer program (product) which includes instructions that cause a computer to carry out a method as described here when the program is executed by a computer.

According to another aspect of the present invention, a machine-readable memory medium is likewise provided on which the introduced computer program is stored. The machine-readable memory medium is a computer-readable data carrier.

According to a further aspect of the present invention, a control unit for a motor vehicle is also provided, the control unit being designed to carry out a method introduced here. The control unit preferably is a device (or a processor) for an ego-localization.

In addition, a motor vehicle is also able to be provided, in accordance with an example embodiment of the present invention, which is equipped with a control unit as introduced here. The motor vehicle preferably is a vehicle that operates in an automated and/or autonomous manner, in particular an autonomous motor vehicle.

Moreover, an adaptive, modular system for ascertaining an integrity range of a parameter estimate is also provided, which is designed to carry out the introduced method. The system may particularly include a base module and at least a (first, second, third, etc.) supplementary module for this purpose.

The details, features and advantageous embodiments described in connection with the present method may correspondingly also occur in the introduced computer program, the memory medium, the control unit, the vehicle and/or the system, and vice versa. To this extent, full reference is made to the comments there for the more detailed characterization of the features.

The solution introduced here as well as its technical environment is described in below based on the figures. It should be pointed out that the present invention is not meant to be restricted by the illustrated exemplary embodiments. In particular, unless explicitly stated to the contrary, it is also possible to extract partial aspects of the matters described in the figures and to combine them with other components and/or ideas from other figures and/or the description.

DETAILED DESCRIPTION OF EXAMPLE EMBODIMENTS

Figure 1:
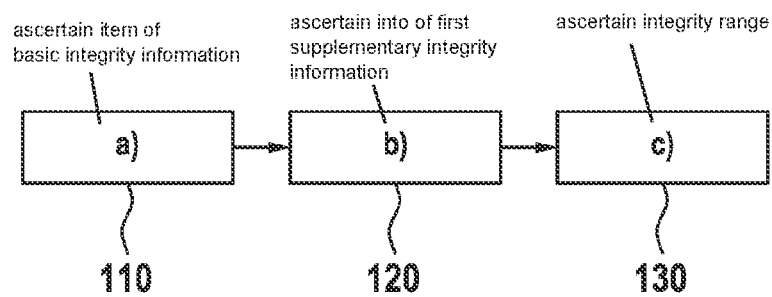
FIG. 1 shows an exemplary sequence of a method in accordance with an example embodiment of the present invention.

FIG. 1 schematically shows an exemplary sequence of a method in accordance with an example embodiment of the present invention. The example method is used for an adaptive ascertainment of an integrity range 1 of a parameter estimate, integrity range 1 describing the range within which an estimated parameter is located with a minimum probability. The series of method steps a), b) and c) represented by blocks 110, 120 and 130 usually comes about in a regular operating sequence. Steps a) and b), in particular, may be at least partly carried out in parallel or even simultaneously.

In block 110, an item of basic integrity information 2 is ascertained with the aid of a base module 3 of a modular system 4. In block 120, an item of first supplementary integrity information 5 is ascertained using a first supplementary module 6 of modular system 4 if at least one precondition for the ascertainment of an item of first supplementary integrity information 5 is satisfied. In block 130, integrity range 1 is ascertained using at least basic integrity information 2, or at least basic integrity information 2 and the item of first supplementary integrity information 5 if the item of first supplementary integrity information 5 was ascertained.

Figure 2:
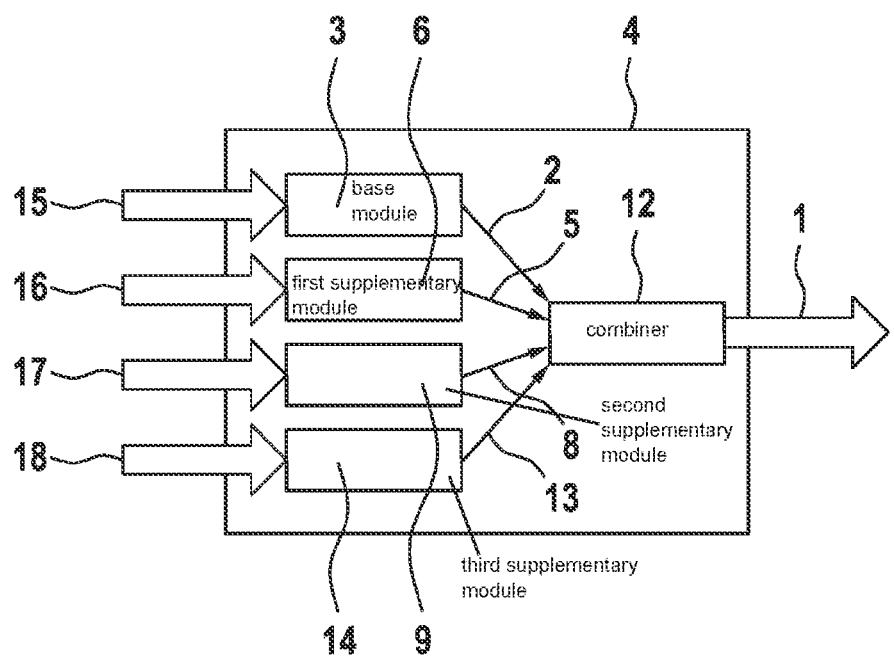
FIG. 2 shows an exemplary development of the modular system in accordance with the present invention.

FIG. 2 schematically shows an exemplary design of modular system 4. (Adaptive) system 4 includes a base module 3 and at least one further supplementary module, in this instance a first supplementary module 6, a second supplementary module 9 and a third supplementary module 14 by way of example. In addition, modular system 4 exemplarily also includes a combiner 12 in this instance, which combines results from base module 3 with results from at least one of the supplementary modules to form an integrity range 1. Integrity range 1 in this case is what is known as a protection level, for instance.

Base module 3 receives basic input data 15 and ascertains at least one item of basic integrity information 2 therefrom. In this context, basic integrity information 2, for instance, may be ascertained on the basis of at least one stochastic parameter or estimation error. In addition, a mathematical basic model may be stored in base module 3.

For example, base module 3 is able to receive basic input data 15, which are derived or taken from a covariance matrix, which is among the states for which an integrity range (protection level) is to be calculated. Base module 3 is universally valid especially for hypergeometric representations, regardless of the dimensional degree.

For example, base module 3 is able to receive basic input data 15 from a covariance matrix and calculate basic integrity information 2 such as a basic confidence range therefrom. This constitutes an example of the possibility that— and also the manner in which—basic integrity information 2 is able to be ascertained on the basis of at least one stochastic parameter or estimation error. The covariance matrix in this case simply represents one example of a representation of possible stochastic parameters or estimation errors (in the form of variances and covariances in this context).

In addition, a mathematical basic model may be stored in base module 3, which, for instance, converts data from the exemplarily mentioned covariance matrix into basic integrity information 2 such as a basic confidence range. The mathematical basic model is able to calculate a geometrical shape such as a circle from an item of covariance information, for example. This geometrical shape may describe or encompass the integrity range. This geometrical shape may subsequently be scaled (in particular enlarged), for instance in order to increase the minimum probability or in order to set it to a certain value. The integrity range scaled in this way then forms a confidence range.

First supplementary module 6 is able to receive first supplementary input data 16 and ascertain at least one item of first supplementary information 5 therefrom. In this context, item of first supplementary integrity information 5, for example, may be ascertained on the basis of at least one quality indicator 7 (not shown here, see FIG. 3) for a data quality of sensor data (among other things).

For example, first supplementary module 6 may include one or more function(s), which calculate(s) an item of first supplementary integrity information 5, e.g., a first supplementary confidence range as a function of at least one quality indicator 7. Quality indicators 7 may represent the current scenarios and/or signal properties (of sensors).

Second supplementary module 9 is able to receive second supplementary input data 17 and ascertain at least one item of second supplementary integrity information 8 therefrom. For example, second supplementary module 9 could include as second supplementary input data 17 information such as residues that result from an adaptation problem (e.g., method of least squares, in particular what is known as a snapshot least squares solution (instantaneous least square estimation solution)).

Third supplementary module 14 is able to receive third supplementary input data 18 and ascertain at least one item of third supplementary integrity information 13 therefrom. For example, third supplementary module 14 could take statistical distributions into account. Third supplementary module 14, for instance, may include a function that receives statistical distributions as third supplementary input data 18 and allocate to these at least one item of third supplementary integrity information 13. One example of supplementary input data 18 may be the quantiles of a statistical distribution. Factors that can be considered to be supplementary integrity information 13 are able to be ascertained based on these quantiles.

For example, combiner 12 may be set up to implement weighting of at least basic integrity information 2, of item of first supplementary integrity information 5, item of second supplementary integrity information 8, and item of third supplementary integrity information 13 (to the extent that it is available). In this context, combiner 12 may be designed to perform weighting as a function of at least one quality indicator 7, for instance.

In addition, further (fourth, fifth, etc.) supplementary modules are able to be used. For instance, one of the modules could be designed to consider the current dynamics of the target platform. In principle, the modules may be exchanged for one another and/or adapted as needed or according to the respective application field.

Figure 3:
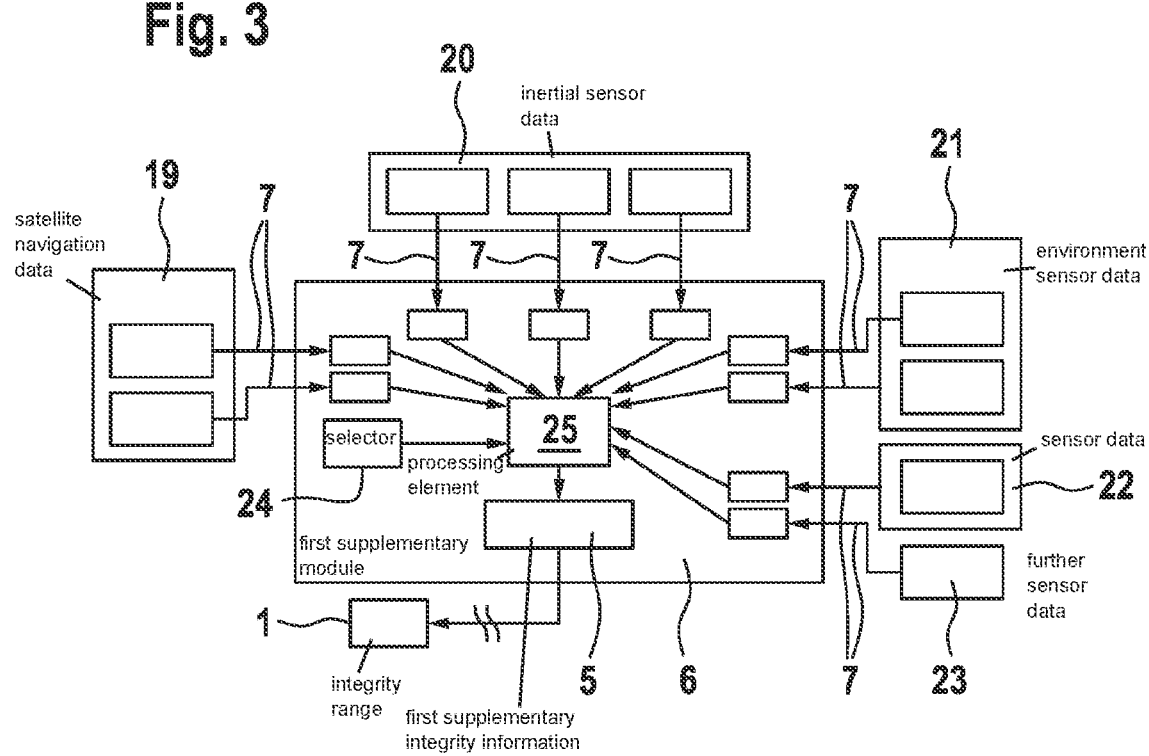
FIG. 3 shows an exemplary refinement of the first supplementary module in accordance with the present invention.

FIG. 3 schematically illustrates an exemplary embodiment of first supplementary module 6. A correspondingly developed first supplementary module 6 could be used in system 4 according to FIG. 2, for instance. The reference numerals are used uniformly so that full reference to the above descriptions can be made, in particular in connection with FIGS. 1 and 2.

According to the exemplary representation in connection with FIG. 3, first supplementary module 6 receives a multitude of quality indicators 7 as first supplementary input data 16. First supplementary module 6 is designed to ascertain at least one item of first supplementary integrity information 5 from at least a portion of received quality indicators 7. For this purpose, processing, in particular including weighting of quality indicators 7, may be carried out in a processing element 25 of first supplementary module 6, for instance.

Functions which allocate a certain item of integrity information or a certain value or value range of an item of integrity information to a certain value or value range of a quality indicator 7 are able to be stored for processing in processing element 25. The individual results of these allocations may then be weighted and combined (merged). Processing element 25 is then able to output the obtained result as item of first supplementary integrity information 5.

A selection as to which ones of the quality indicators 7 are to be considered in this context may be made with the aid of a selector 24 of first supplementary module 6. In addition, the selector 24 is also able to select or sort quality indicators 7 according to their priority.

Quality indicators 7 are those for a data quality. In other words, this particularly means that quality indicators 7 include a quality of data such as their age, signal noise, signal frequency and/or significance or influence for a specific application scenario. If a quality indicator 7 is one for a data quality of sensor data, then this quality indicator 7 may furthermore (alternatively or cumulatively) also (generally) describe the trust in the sensor supplying the sensor data or the trust in the type of sensor data.

The parameter estimate for which the integrity range is to be ascertained is normally based on different data such as sensor data and/or map data. Among the sensor data which may be available in a motor vehicle, for instance, are in particular navigation satellite data 19, inertial sensor data 20, and environment sensor data 21. Further sensor data 23 are also possible. Quality indicators 7 used in this context relate in particular to at least a portion of these data.

In this context, FIG. 3 also illustrates that item of first supplementary integrity information 5 is preferably ascertained on the basis of at least two different quality indicators 7, possibly quality indicators 7 that are weighted against each other for the data quality of sensor data from one or more (different) sensor(s) 19, 20, 21, 22. In this way, the ascertainment of integrity range 1 is advantageously able to be based on the most heterogeneous input information possible.

In this instance, in particular an approach for the consideration and weighting of selected signals as quality indicators 7 is described in order to be advantageously able to calculate integrity range 1 (especially the protection level) based on heterogeneous input information on the one hand, and especially in order to allow a configuration for prioritizing quality indicators 7 while taking different features into account on the other hand.

Mathematical algorithms for calculating an item of integrity information of a parameter estimate, as these may be implemented in one of the other modules, for example, especially in base module 3, in most cases use the (co)variances or residues resulting from the parameter estimate (e.g., Kalman filter, least squares) and calculate an item of integrity information therefrom, or possibly even a protection level.

However, one disadvantage of the sole application of corresponding mathematical solutions could be seen in that only such errors that were also considered in the stochastic modeling or in the (mathematical) error model are usually able to be imaged. In contrast, the consideration of the in particular different quality indicators 7 introduced here offers the advantage that different latencies, resolutions and qualities of the input signals from different sensors are (also) able to be taken into account in the calculation of the integrity range.

A parameter estimate (calculation of an estimated item of output information) such as the vehicle position is usually carried out with the aid of different sensors/input parameters (GNSS signals, correction data, inertial sensor system, pressure sensors, wheel sensors, video, etc.). Each one of these inputs, but also the approaches and models for performing the estimate (calculation of this estimated output information) may supply different data that are able to be used for categorizing the quality. For example, quality indicators can be signal noise of a GNSS receiver, the age of GNSS correction data, but also simply the ascertained velocity or position of the vehicle. Various indicators are possible in this context and may be selected as a function of the application.

Another advantage of the introduced embodiment variant is the use of quality indicators for a weighted determination of the integrity range (protection level), the weighting in particular being able to be carried out on the basis of different features such as the data age, the signal frequency, signal noise, the significance of or the influence on a specific application scenario, or, generally, on the trust in specific sensors.

Different quality indicators are preferably used and/or weighted (in particular on the basis of a defined prioritization). In step b) (or block 120), for instance, relevant quality indicators are able to be selected in a first sub-step. These may subsequently be collected, for instance in a second sub-step, in a processing and/or weighting element. In this context, the quality indicators, in particular corresponding to a configuration for their prioritization, may include information that indicates the weight at which the indicators are to be incorporated into the calculation of the integrity range. Some possibilities in this regard are the data age, signal frequency, signal noise, significance of or influence on a specific application scenario, or generally the trust in specific sensors.

In addition, a weighting of signals with the aid of quality indicators may be carried out in the calculation of the integrity ranges. Different scenarios are possible, and only one example of the prioritization of the age is to be described. In this case, the weighting of the sensor signals in the calculation of the integrity range (protection level) could be implemented as a function of the age of the sensor data. The considered quality indicator thus would be the data age and relates to the instant of the most recent measurement of a sensor. The older the input data, the more lightly the component would be considered in the overall calculation of the integrity range.

The number and type of quality indicators are able to be selected as a function of the application and the number of (input) sensors. The embodiment variant described here should be understood to represent merely one example.

Figure 4:
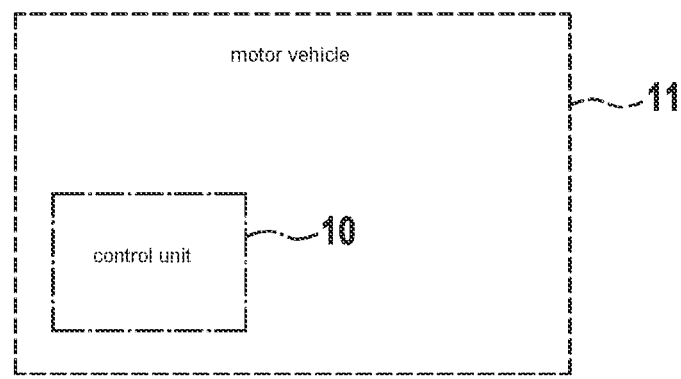
FIG. 4 shows a motor vehicle having an exemplary embodiment of the control unit in accordance with the present invention provided here.

FIG. 4 schematically shows a motor vehicle 11 having an exemplary embodiment of a control unit 10 provided here. Control unit 10 is developed to carry out a method introduced here for the adaptive ascertaining of an integrity range 1 of a parameter estimate.

What is claimed is:

1. A method for adaptive ascertainment of an integrity range of a parameter estimate, the method comprising:
   a) ascertaining an item of basic integrity information using a base module of a modular system, wherein the integrity range describes a range within which an estimated parameter is located with a minimum probability;
   b) ascertaining an item of first supplementary integrity information using a first supplementary module of the modular system when at least one precondition for the ascertaining of the item of first supplementary integrity information has been satisfied; and
   c) ascertaining the integrity range using: (i) the item of basic integrity information, or (ii) the basic integrity information and the item of first supplementary integrity information when the item of first supplementary integrity information was ascertained;
   wherein the parameter estimate is for a modular adaptive system having the base module, at least one supplementary module, including the first supplementary module, and a combiner, which combines results from the base module with results from at least one of the supplementary modules to form the integrity range,
   wherein the parameter estimate includes a position estimate,
   wherein the base module receives basic input data and ascertains at least one item of the basic integrity information therefrom, and
   wherein the base module is able to receive basic input data, which are derived or taken from a covariance matrix, which is among a plurality of states for which the integrity range is to be determined.

2. The method as recited in claim 1, wherein the basic integrity information is ascertained based on at least one stochastic parameter.

3. The method as recited in claim 1, wherein a mathematical basic model is stored in the base module.

4. The method as recited in claim 1, wherein the item of first supplementary integrity information is ascertained based on at least one quality indicator for a data quality, wherein the at least one quality indicator includes at least one of an age, a signal noise, a signal frequency and/or a significance or influence for a specific application scenario.

5. The method as recited in claim 1, wherein in step c), weighting of at least the basic integrity information and the item of first supplementary information is carried out when the item of first supplementary integrity information was ascertained.

6. The method as recited in claim 1, wherein weighting as a function of at least one quality indicator takes place, wherein the at least one quality indicator includes at least one of an age, a signal noise, a signal frequency and/or a significance or influence for a specific application scenario.

7. The method as recited in claim 1, wherein at least one item of second supplementary integrity information is determined using a second supplementary module of the modular system when at least one precondition for the ascertainment of the item of second supplementary integrity information is satisfied.

8. A non-transitory machine-readable memory medium, on which is stored a computer program, which is executable by a processor, comprising:
   a program code arrangement having program code for adaptive ascertainment of an integrity range of a parameter estimate, by performing the following:
   a) ascertaining an item of basic integrity information using a base module of a modular system, wherein the integrity range describes a range within which an estimated parameter is located with a minimum probability;
   b) ascertaining an item of first supplementary integrity information using a first supplementary module of the modular system when at least one precondition for the ascertaining of the item of first supplementary integrity information has been satisfied; and
   c) ascertaining the integrity range using: (i) the item of basic integrity information, or (ii) the basic integrity information and the item of first supplementary integrity information when the item of first supplementary integrity information was ascertained;
   wherein the parameter estimate is for a modular adaptive system having the base module, at least one supplementary module, including the first supplementary module, and a combiner, which combines results from the base module with results from at least one of the supplementary modules to form the integrity range,
   wherein the parameter estimate includes a position estimate,
   wherein the base module receives basic input data and ascertains at least one item of the basic integrity information therefrom, and
   wherein the base module is able to receive basic input data, which are derived or taken from a covariance matrix, which is among a plurality of states for which the integrity range is to be determined.

9. A control apparatus for a motor vehicle to adaptively ascertain an integrity range of a parameter estimate, comprising:
   a control unit configured to perform the following:
   a) ascertaining an item of basic integrity information using a base module of a modular system, wherein the integrity range describes a range within which an estimated parameter is located with a minimum probability;
   b) ascertaining an item of first supplementary integrity information using a first supplementary module of the modular system when at least one precondition for the ascertaining of the item of first supplementary integrity information has been satisfied; and
   c) ascertaining the integrity range using: (i) the item of basic integrity information, or (ii) the basic integrity information and the item of first supplementary integrity information when the item of first supplementary integrity information was ascertained;
   wherein the parameter estimate is for a modular adaptive system having the base module, at least one supplementary module, including the first supplementary module, and a combiner, which combines results from the base module with results from at least one of the supplementary modules to form the integrity range, wherein the parameter estimate includes a position estimate, wherein the base module receives basic input data and ascertains at least one item of the basic integrity information therefrom, and wherein the base module is able to receive basic input data, which are derived or taken from a covariance matrix, which is among a plurality of states for which the integrity range is to be determined.

* * * * *